United States Patent [19]

Landin

[11] Patent Number: 4,985,488

[45] Date of Patent: Jan. 15, 1991

[54] PRESSURE-SENSITIVE ADHESIVE HAVING IMPROVED ADHESION TO PLASTICIZED VINYL SUBSTRATES

[75] Inventor: Donald T. Landin, Saint Paul, Minn.

[73] Assignee: Minnesota Mining and Manufacturing Company, St. Paul, Minn.

[21] Appl. No.: 509,219

[22] Filed: Apr. 16, 1990

Related U.S. Application Data

[62] Division of Ser. No. 196,441, May 20, 1988, Pat. No. 4,946,742.

[51] Int. Cl.$^5$ .......................... C09J 7/02; B32B 27/04; B32B 27/22
[52] U.S. Cl. ................................ 524/555; 428/354; 428/45355; 428/343; 524/548
[58] Field of Search .............. 428/343, 345, 355, 354; 526/264; 524/555, 548

[56] References Cited

U.S. PATENT DOCUMENTS

| | | | |
|---|---|---|---|
| Re. 32,249 | 9/1986 | Esamy | 428/40 |
| 3,009,235 | 11/1961 | De Mestral | 28/78 |
| 3,615,972 | 10/1971 | Morehouse, Jr. et al. | 156/79 |
| 3,725,122 | 4/1973 | Reinhard et al. | 117/122 |
| 3,900,674 | 8/1975 | Coffman | 428/355 |
| 4,045,600 | 8/1977 | Williams | 427/379 |
| 4,181,752 | 1/1980 | Martens et al. | 427/54.1 |
| 4,223,067 | 9/1980 | Levens | 428/308 |
| 4,272,573 | 6/1981 | Ewald et al. | 428/355 |
| 4,284,681 | 8/1981 | Tidmarsh | 428/246 |
| 4,296,017 | 10/1981 | Weissgerber et al. | 260/30.6 |
| 4,303,485 | 12/1981 | Levens | 204/159.24 |
| 4,329,384 | 5/1982 | Vesley et al. | 428/40 |
| 4,330,590 | 5/1982 | Vesley | 428/336 |
| 4,364,972 | 12/1982 | Moon | 427/54.1 |
| 4,379,201 | 4/1983 | Heilmann et al. | 428/345 |
| 4,510,197 | 4/1985 | Shah | 428/220 |
| 4,513,039 | 4/1985 | Esmay | 428/40 |
| 4,522,870 | 6/1985 | Esmay | 428/252 |
| 4,595,737 | 6/1986 | Straub et al. | 526/264 |
| 4,599,265 | 7/1986 | Esmay | 428/355 |
| 4,605,592 | 8/1986 | Paquette et al. | 428/334 |
| 4,726,982 | 2/1988 | Traynor et al. | 428/213 |
| 4,731,402 | 3/1988 | Penzel et al. | 524/555 X |
| 4,732,635 | 3/1988 | Levens | 156/230 |
| 4,753,846 | 6/1988 | Mudge | 428/343 |
| 4,762,747 | 8/1988 | Min Liu | 428/343 |

FOREIGN PATENT DOCUMENTS

| | | | |
|---|---|---|---|
| 995124 | 8/1976 | Canada | 154/141 |
| 0150978 | 9/1986 | European Pat. Off. | |
| 53-55345 | 5/1978 | Japan | |
| 53-94519 | 8/1978 | Japan | |
| 248786 | 12/1985 | Japan | |
| 1051125 | 12/1966 | United Kingdom | |
| 2162191A | 1/1986 | United Kingdom | |

OTHER PUBLICATIONS

"Development of Acrylic Latex Pressure Sensitive Adhesive for Plasticized PVC Films", by Dr. Louis C. Graziano (Journal of Plastic Film & Sheeting, vol. 2, Apr., 1986).

*Primary Examiner*—George F. Lesmes
*Assistant Examiner*—D. R. Zirker
*Attorney, Agent, or Firm*—Donald M. Sell; Walter N. Kirn; Richard E. Brink

[57] ABSTRACT

Normally tacky and pressure-sensitive adhesive, having excellent long-term adhesion to plasticized vinyl substrates, is prepared from a representative blend of dioctyl phthalate plasticizer and a copolymer of isoctyl acrylate, N-vinyl pryrrolidone, and acrylic acid; alternatives for each component are disclosed. In a preferred embodiment of the invention, the adhesive is coated in a thin layer on a sheet backing material to form a normally tacky and pressure-sensitive adhesive tape.

7 Claims, No Drawings

PRESSURE-SENSITIVE ADHESIVE HAVING IMPROVED ADHESION TO PLASTICIZED VINYL SUBSTRATES

This is a division of application Ser. No. 196,441 filed May 20, 1988, now U.S. Pat. No. 4,946,742.

BACKGROUND OF THE INVENTION

This invention relates to normally tacky and pressure-sensitive adhesive (PSA) compositions and to PSA tapes made therewith. The invention is particularly concerned with PSA products capable of adhering firmly to plasticized vinyl substrates, both initially and after contact over an extended period of time.

Polyvinyl chloride (or, as it is more commonly referred to, "vinyl") is one of the most versatile and widely used synthetic polymers available today. In its unmodified form, it is rigid and capable of being fabricated into containers, structural components, tubing, etc. When compounded with a plasticizer, it can be calendered into flexible sheet material that can be used as upholstery fabric, floor covering, PSA tape backing, rainwear, etc., or extruded as electrical insulation, auto body side moulding, etc. Plasticized vinyls typically contain 15-50% by weight of either a mononeric or a polymeric plasticizer; because the monomeric plasticizers are less expensive, they are more commonly employed. Unfortunately, however, the monomeric plasticizers are of relatively low molecular weight, tending not only to migrate to the surface of the plasticized vinyls but also to volatilize therefrom, gradually embrittling the originally flexible product.

The tendency of plasticizer to migrate into materials with which it comes in contact is also well known; see, e.g., U.S. Pat. No. 4,284,681. Thus, when a PSA is applied to a plasticized vinyl substrate and allowed to remain in contact with it for an extended period of time, plasticizer from the vinyl tends to migrate into the PSA, softening it and causing a decrease in adhesion; see, e.g., U.K. Pat. No. 1,051,125.

Attempts have been made to solve the plasticizer migration problem by interposing an impenetrable barrier between the vinyl and the PSA; see, e.g., U.S. Pat. Nos. 4,045,600 and 4,605,592. Others have developed PSAs that are said to be less susceptible to weakening by plasticizer; see, e.g., Graziano et al., Development of Acrylic Latex Pressure Sensitive Adhesive for Plasticized PVC films, *Journal of Plastic Film & Sheeting*, Vol. 2, April 1986, pp. 95-110. A commercially available tape that is widely used for adhering to plasticized vinyl utilizes a PSA that is a terpolymer of 2-ethyl hexyl acrylate, vinyl acetate, and ethyl acrylate.

Another attempt to prevent migration of plasticizer from a plasticized vinyl substrate into a confronting PSA has been to incorporate plasticizer into the PSA, thereby minimizing the plasticizer gradient between the contacting layers; see, e.g., U.S. Pat. No. 4,272,573, U.K. Pat. App. No. 2,162,191-A, and European Pat. App. No. 150,978.

Despite the limited success achieved by products of the type discussed in preceding paragraphs, there has remained a strong commercial desire for a PSA that was more effective, particularly one that not only initially adhered strongly to plasticized vinyl but which also retained a high degree of adhesion after remaining in contact with it for extended periods of time. In particular, none of the prior art products have been able to provide excellent resistance to shear after prolonged contact with plasticized vinyl.

BRIEF SUMMARY

The present invention provides a PSA having excellent initial adhesion to plasticized vinyl substrates. Even more significant, however, is the fact that excellent adhesion is maintained after the PSA has been in contact with the vinyl for extended periods of time. In accordance with the invention, it is also possible to provide a PSA that retains excellent shear adhesion after prolonged contact with a plasticized vinyl substrate.

The invention comprises a polymer of monomers consisting essentially of (1) 60-88 parts by weight of acrylic acid ester of nontertiary alkyl alcohol containing isooctyl acrylate or isononyl acrylate, (2) 2-30 parts by weight of polar nitrogen-containing vinyl monomer, such as N-vinyl pyrrolidone, N-vinyl caprolactone, N,N-pentaethylene acrylamide, or N,N-dimethyl acrylamide, and (3) 0-12 parts of vinyl acid such as acrylic acid, methacrylic acid, or itaconic acid. Intimately blended with the polymer, in an amount suitable to achieve the desired degree of pressure-sensitive adhesion, is a plasticizer such as dioctyl phthalate (DOP), 2-ethyl hexyl phosphate (2EHP), or tricresyl phosphate (TCP). The amount of plasticizer generally constitutes 2-35% (preferably 2-10%) by weight of the PSA. In most cases, the PSA will be in the form of a thin layer carried by a backing to which it may be either permanently or temporarily adhered. Where the PSA is permanently adhered, the resultant product is a normally tacky and pressure-sensitive adhesive tape. Where the backing is provided with a release coating, the PSA is in the form of a so-called transfer tape.

Where a PSA having excellent shear adhesion to plasticized vinyl is desired, an effective amount of crosslinking agent (e.g., 0.15 part of a photoreactive s-triazine) may be added to the PSA. Presently preferred crosslinking agents include {2,4-bistrichloromethyl-6(4-methoxyphenyl)-s-triazine}, and {2,4-bistrichloromethyl-6(3,4-dimethoxyphenyl)-s-triazine}.

It is surprising that an extremely small amount of plasticizer (as low as 2%) in the PSA is effective to impart excellent adhesion to vinyl containing as much as 50% monomeric plasticizer. It is also surprising that the plasticizer in the PSA need not be the same as the plasticizer in the vinyl. It has been found empirically that the unpredictably good adhesion, even after extended heat aging, flows from the incorporation of the polar N-containing vinyl monomer, although the reason is not fully understood.

DETAILED DESCRIPTION

In the examples that will appear below, certain test procedures were used to evaluate the ability of a given PSA to adhere to plasticized vinyl substrates.

90° Peel Adhesion. This test is conducted in accordance with a modified version of PSTC-14, a procedure specified in "Test Methods for Pressure-Sensitive Tapes," 8th edition, available from the Pressure-Sensitive Tape Council, 1800 Pickwick Ave., Glenview, Ill. 60025-1377, U.S.A. A strip of the tape to be tested, 2.54 cm wide × 30 cm. long, is adhered to a test panel, which in turn is mounted on a sled and clamped horizontally in the lower jaw of a tensile testing machine. One end of the tape is then stripped away and clamped in the upper jaw of the tensile tester. The jaws are then separated at approximately 30.5 cm/minute while measuring the force required to remove the tape at an angle of 90°. Results are measured in oz/inch of width and converted to N/dm.

180° Peel Adhesion. This test is conducted in accordance with PSTC-7, a procedure specified in the same publication referred to above. A strip of tape 12.7 mm wide and about 30 cm long is adhered to a panel about 5 cm×12.5 cm. One end of the tape is then doubled back on itself to expose about 2.5 cm at the end of the panel. This exposed end is then clamped in the upper jaws of a tensile testing machine and the doubled-back free end of the tape clamped in the lower jaws. The jaws are then separated at about 30 cm/minute. The force required to strip the tape from the panel is measured in oz/½ inch and reported as N/dm.

T-Peel Adhesion. A 25.4-cm×10-cm strip of the tape to be tested is laminated to a flexible strip of the substrate to which, adhesion is to be determined. The two strips of the 4-cm length adjacent one end are separated and clamped in the upper and lower jaws of a tensile tester respectively. The jaws are then moved apart at approximately 30 cm/minute while measuring the force required to separate the two strips.

Shear Adhesion. This test is conducted in accordance with PSTC-7, a procedure specified in the same publication referred to above. A 12.7-mm×10-cm strip of the tape to be tested is applied to a vertical test panel so that a terminal 25.4-mm×12.7-mm area is in contact. A weight of either 250 or 500 grams is then applied to the free end of the tape and the time to failure noted. If no failure has occurred in 10,000 minutes, the test is discontinued.

Understanding of the invention will be enhanced by referring to the following examples, in which all parts and percentages are by weight unless otherwise noted.

EXAMPLE 1

A pressure-sensitive adhesive tape was made by partially photopolymerizing a mixture of 60 parts isooctyl acrylate (IOA) and 24 parts N-vinyl pyrrolidone (NVP) in the presence of 0.04 part 2,2-dimethoxy-2-phenyl acetophenone (IRG 651) photocatalyst. The partial photopolymerizing was accomplished in an inert (nitrogen) atmosphere using a bank of 40-watt fluorescent black lights (Sylvania model no. F48T12/22011/40) to provide a coatable syrup having a viscosity of about 1.5 Pa.s. To this syrup was then added 2 parts acrylic acid (AA), 14 parts DOP plasticizer, 0.15 part {2,4-bistrichloromethyl-6(4-methoxyphenyl)-s-triazine}, a photoreactive s-triazine crosslinking agent (XL-353), and 0.10 part IRG 651 photocatalyst. The mixture was knife coated onto a first biaxially oriented polyethylene terephthalate film and covered by a second such film at a knife setting which was adjusted to squeeze the syrup to provide a uniform coating about 0.127 mm thick, the surfaces of the two films in contact with the adhesive composition having previously been provided with low adhesion release coatings. The composite was exposed to a bank of Sylvania 40-watt ultraviolet fluorescent lamps, providing ultraviolet radiation at a rate of 1 mw/sec/cm².

EXAMPLE 2

Same as Example 1 except that the IOA:NVP:AA:DOP ratio was 60:21.8:7.6:10.6.

EXAMPLE 3

Same as Example 1 except that the IOA:NVP:AA:DOP ratio was 69:17:4:10 and the DOP plasticizer was replaced with TCP.

EXAMPLE 4

Same as Example 1 except that the IOA:NVP:AA:DOP ratio was 69:17:4:10 and the XL-353 crosslinker was replaced with {2,4-bistrichloromethyl-6(4-methoxyphenyl)-s-triazine}.

EXAMPLE 5

Same as Example 4 except that the IOA:NVP:AA:DOP ratio was 67.6:22.5:2.0:7.9.

EXAMPLE 6

Same as Example 4 except that the IOA:NVP:AA:DOP ratio was 68:25:2:5.

EXAMPLE 7

Same as Example 4 except that the IOA was replaced by isononyl acrylate (INA).

EXAMPLE 8

Same as Example 4 except that the IOA was replaced by butyl acrylate (BA).

EXAMPLE 9

Same as Example 4 except that the DOP was replaced by mineral oil.

To obtain a somewhat more viscous syrup for coating purposes, blends of syrups were prepared generally as taught in Examples 1–9 except that copolymers were prepared and blended.

EXAMPLE 10

An 80:20 IOA:NVP was prepared, as was a 90:10 IOA:AA syrup. Equal parts of the two syrups and DOP were then blended, after which photopolymerization was completed. The resultant adhesive thus had an IOA:NVP:AA:DOP ratio of 66:6.6:3.3:33.

EXAMPLE 11

An 80:20 IOA:NVP copolymer was prepared; 67 parts of this copolymer was then blended with 7.5 parts AA and 25.5 parts DOP, after which photopolymerization was completed. The resultant adhesive thus had an IOA:NVP:AA:DOP ratio of 53.6:13.4:7.5:25.5.

EXAMPLE 12

Same as Example 4 except that the 17 parts of NVP was replaced with 17 parts of N,N-dimethylacrylamide.

EXAMPLE 13

Same as Example 4 except that the 17 parts of NVP was replaced with 17 parts of N,N-pentamethylene acrylamide.

Control A

Same as Example 4 except that no NVP was included, and the IOA:NVP:AA:DOP ratio was 88:0:7:5.

The tapes of Examples 1–11 and Control A were then evaluated for their adhesion to two types of plasticized vinyl, viz., a black electrical cable jacketing plasticized with 33.8% 2EHP and a decorative trim strip plasticized with 27.8% 2EHP. Duplicate samples of each tape were adhered to each of the two test panels. One taped panel of each pair was allowed to stand at room temperature (RT) for three days, while the other taped panel of each pair was placed in a 70° C. (HT) oven for one week. (It is believed that exposure at HT for one week corresponds to exposure at RT for about one year.) As a frame of reference, the best commercially available tape for adhesion to plasticized vinyl was subjected to the same conditions. (The control tape, identified as "Control B" had a 12.5-micrometer polyester film backing coated on each side with a 57-micrometer layer of a PSA believed to be a 2-ethyl hexyl acrylate:ethyl acrylate copolymer blended with a vinyl acetate polymer.) 180° peel adhesion tests were then performed, with the following results:

TABLE I

| Example No | Adhesion, N/dm, to Substrate after Exposure Indicated | | | |
|---|---|---|---|---|
| | Cable Jacketing | | Vinyl Trim | |
| | RT | HT | RT | HT |
| 1 | 59 | 46 | 61 | 44 |
| 2 | 81 | 61 | 74 | 35 |
| 3 | 70 | 53 | 79 | 42 |
| 4 | 61 | 57 | 61 | 46 |
| 5 | 99 | 66 | 77 | 66 |
| 6 | 79 | 31 | 83 | 42 |
| 7 | 48 | 35 | 77 | 28 |
| 8 | 57 | 59 | 59 | 48 |
| 9 | 66 | 59 | 74 | 66 |
| 10 | | | 72 | 39 |
| 11 | | | 118 | 85 |
| 12 | 99 | 57 | 110 | 77 |
| 13 | 88 | 61 | 125 | 83 |
| Control A | 42 | 11 | 48 | 20 |
| Control B | | 28 | | 26 |

The tape of Example 4 was then compared to Control tape B for adhesion to the surface of vinyl bars containing varying degrees of plasticizer. In each case, a roll of the tape to be tested was placed in a 70° C. oven for 3 days prior to testing. 90° peel adhesion tests were performed after aging the taped substrate one week at 70° C. Shear tests were performed at 70° C. using a stainless steel panel as the substrate and applying either a 250-g or 500-g weight. Results are tabulated below:

TABLE II

| | Comparative Adhesion and Shear Tests | | | |
|---|---|---|---|---|
| | 90° Peel Adhesion N/dm | | Shear Adhesion at 70° C., Minutes | |
| Substrate | Control B | Example 4 | Control B | Example 4 |
| UPVC | 114 | 256 | | |
| Semi-rigid PVC | 103 | 95 | | |
| Flexible PVC | 30 | 68 | | |
| Highly plasticized PVC | 19 | 48 | | |
| Stainless Steel | | | 1,728 (250 g) | 10,000+ (500 g) |

It will be noted that, in almost every instance, the peel adhesion of the tape made according to the present invention was significantly better than the best prior art tape commercially available. It will also be noted that the shear adhesion of the experimental tape was dramatically superior to that of the prior art product.

Using azobisisobutyronitrile as a thermal initiator, two different copolymers were prepared as 40% solids solutions in ethyl acetate at 55° C. having a 69:17:4:10 IOA:NVP:AA:DOP ratio and the second having a 77:19:4 IOA:NVP:AA monomer ratio. Each of the two solutions was then diluted to 25% solids by adding ethyl acetate. Four additional examples and a control were prepared from these copolymers as described below:

EXAMPLE 14

To the first copolymer described in the preceding paragraph was added 0.5% of a proprietary crosslinking agent, based on the polymer solids. The resulting solution was then coated on a polyethylene-coated paper backing and the solvent evaporated in a 150° C. oven over a ten-minute period to leave a 127-micrometer adhesive coating.

EXAMPLE 15

Same as Example 14 except that crosslinking was effected under U.V. light with 0.15% of the s-triazine crosslinker of Example 4.

EXAMPLE 16

To the second copolymer described above was added 0.5% of the proprietary crosslinking agent of Example 8, and 10% DOP. The resulting solution was then coated on a polyethylene-coated paper backing and the solvent evaporated to leave a 127-micrometer adhesive coating.

EXAMPLE 17

Same as Example 16 except that crosslinking was effected under U.V. light with 0.15% of the triazine of Example 4.

"Control C" for Examples 14-17

Same as Example 8 except that for the first copolymer a conventional 90:10 IOA:AA adhesive was substituted.

90° peel adhesion tests were run against vinyl trim and cable jacketing substrates with each of tapes 14-17 inclusive and the control. Duplicate samples were prepared, one being allowed to age 72 hours at room temperature and the other one week at 70° C. Results are tabulated below:

TABLE III

| | 90° Peel Adhesion to Indicated Substrates, N/dm | | | |
|---|---|---|---|---|
| | Cable Jacketing | | Vinyl Trim | |
| Example | RT | HT | RT | HT |
| 14 | 146 | 76 | 120 | 74 |
| 15 | 146 | 78 | 132 | 66 |
| 16 | 136 | 78 | 108 | 68 |
| 17 | 144 | 64 | 120 | 72 |
| Control C | 38 | 10 | 44 | 14 |

The tabulated data show that superior adhesion is obtained when the PSA is a copolymer of monomers essentially comprising polar N-containing vinyl monomer, in this case NVP.

As is apparent from the foregoing illustrative examples, numerous variations of the invention will occur to those skilled in the art who read this disclosure. A few general principles might be noted. When it is essential to have a PSA that possesses high shear adhesion (e.g., for attachment to a vertical vinyl surface), crosslinking is desirable. It should be pointed out, however, that adhesives displaying high shear tend to lack ready conformability and "rapid wet out," or quick stick. When the amount of plasticizer in the adhesive is increased, a greater percentage of NVP or analogous monomers can be used. Increasing the amount of plasticizer, without further modification, tends to soften the adhesive and reduce its holding power.

Glass microbubbles can also be incorporated in adhesives made in accordance with the invention to achieve a foamlike product similar to that disclosed in U.S. Pat. No. 4,223,067; similarly, polymeric microbubbles can be incorporated in such products. Transfer tapes made in this manner possess an apparently unique ability to bond firmly to the plasticized vinyl autobody moulding strips in widespread use.

EXAMPLES 19 and 20

Plasticized adhesive compositions generally similar to those of Example 4 were prepared in essentially the same way and applied to the back surface of hook-and-loop fastener material of the type described in U.S. Pat. No. 3,009,235. The backing of the fastener material was a woven nylon fabric, and the adhesive was applied in a layer about 0.25 mm thick. T-peel adhesion tests were then run against a clear 0.375-mm vinyl substrate containing 26% of a semilinear phthalate (believed to be 2-ethyl hexyl phthalate) plasticizer, after 24 hours dwell at room temperature and after aging at 70° C. for 7 days. Results are tabulated below:

| Example | IOA:NVP:AA:DOP ratio | 180° Peel adhesion, N/dm | |
|---|---|---|---|
| | | Initial | Heat-aged |
| 18 | 67:28.6:2.2:2.2 | 224 | 156 |
| 19 | 65:28:2.7:4.3 | 219 | 163 |

These products were useful as closures for plasticized vinyl notebooks and blanket bags. Compared to the adhesive on conventional hook-and-loop products, which is a ketone-activatable adhesive, the PSA on the products of Examples 18 and 19 were free from air pollution, more convenient, and faster bonding.

I claim:

1. Normally tacky and pressure-sensitive adhesive having outstanding ability to bond to plasticized vinyl substrates and to remain firmly bonded thereto even after remaining in contact therewith for extended periods of time, comprising:

a copolymer of 100 parts of monomers consisting essentially of 60–88 parts of acrylic acid ester of non-tertiary 4–14 carbon alkyl alcohol, 2–30 parts of polar nitrogen-containing vinyl monomer, and 0–12 parts of vinyl carboxylic acid, said copolymer being intimately blended with 2–35% of plasticizer based on said copolymer, the adhesive being characterized by having a 180° peel adhesion to plasticized vinyl cable jacketing of at least 48 N/dm after being adhered thereto for three days at room temperature, and at least 31 N/dm after being adhered thereto for one week at 70° C.

2. The adhesive of claim 1 wherein the acrylic acid ester is isooctyl acrylate.

3. The adhesive of claim 2 wherein the nitrogen-containing vinyl polymer is N-vinyl pyrrolidone.

4. The adhesive of claim 2 wherein the nitrogen-containing vinyl polymer is N,N-dimethylacrylamide.

5. The adhesive of claim 2 wherein the nitrogen-containing vinyl monomer is N,N-pentamethylene acrylamide.

6. The adhesive of claim 3 wherein the plasticizer is monomeric.

7. The adhesive of claim 5 wherein 2–10 parts of plasticizer are employed.

* * * * *

UNITED STATES PATENT AND TRADEMARK OFFICE
CERTIFICATE OF CORRECTION

PATENT NO. : 4,985,488

DATED : January 15, 1991

INVENTOR(S) : Donald T. Landin

It is certified that error appears in the above-identified patent and that said Letters Patent is hereby corrected as shown below:

Title Page:

Abstract: Line 4, correct the spelling of "isoctyl" to --isooctyl--.

Column 2, line 17, before "isooctyl" insert --4-14 carbon atoms, such as butyl acrylate, or especially--.

Column 5, line 65, before "having" insert --the first--.

Signed and Sealed this

Twentieth Day of October, 1992

*Attest:*

DOUGLAS B. COMER

*Attesting Officer*   *Acting Commissioner of Patents and Trademarks*